US007781532B2

(12) United States Patent
Nakatani et al.

(10) Patent No.: US 7,781,532 B2
(45) Date of Patent: Aug. 24, 2010

(54) FLUORINE-CONTAINING POLYMER POWDER, METHOD FOR PRODUCING THE SAME AND COATED ARTICLE

(75) Inventors: Yasukazu Nakatani, Settsu (JP); Toshio Miyatani, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1070 days.

(21) Appl. No.: 11/477,544

(22) Filed: Jun. 30, 2006

(65) Prior Publication Data

US 2006/0247385 A1 Nov. 2, 2006

Related U.S. Application Data

(62) Division of application No. 10/475,862, filed as application No. PCT/JP02/04117 on Apr. 25, 2002, now Pat. No. 7,094,838.

(30) Foreign Application Priority Data

Apr. 26, 2001 (JP) .......................... P2001-129222

(51) Int. Cl.
*C08F 6/00* (2006.01)
(52) U.S. Cl. .................. 525/326.2; 525/356; 525/378; 525/379; 525/326.4
(58) Field of Classification Search .............. 525/326.2, 525/326.4, 356, 378, 379
See application file for complete search history.

(56) References Cited

U.S. PATENT DOCUMENTS 4,742,122 A 5/1988 Buckmaster et al.
4,898,779 A 2/1990 Yoshimura et al.
4,914,158 A 4/1990 Yoshimura et al.
5,115,038 A * 5/1992 Ihara et al. ............... 525/326.2
5,646,192 A * 7/1997 Dolan et al. .................. 521/56
6,376,647 B1 4/2002 Tomihashi et al.
6,476,151 B1 * 11/2002 Araki et al. ................. 525/276
2003/0130432 A1 * 7/2003 Araki et al. ................. 525/276

FOREIGN PATENT DOCUMENTS

| CA | 1248292 A | 1/1989 |
|---|---|---|
| EP | 0 178 935 A1 | 4/1986 |
| EP | 0 220 910 A2 | 5/1987 |
| EP | 0 272 659 A2 | 6/1988 |
| EP | 0 457 255 A2 | 11/1991 |
| EP | 0 606 493 A1 | 7/1994 |

(Continued)

OTHER PUBLICATIONS

International Search Report for PCT/JP02/04117 dated Aug. 13, 2002.
English translation of International Preliminary Examination Report for PCT/JP02/04117 dated Apr. 2, 2003.

*Primary Examiner*—Peter D. Mulcahy
*Assistant Examiner*—Henry Hu
(74) *Attorney, Agent, or Firm*—Sughrue Mion, PLLC

(57) ABSTRACT

A stabilized fluorine-containing polymer powder having an average particle size of 5 to 100 μm is prepared by contacting a fluorine-containing polymer powder, which is prepared by milling the fluorine-containing polymer and removing fine particles, fibrous particles and coarse particles by classification, with a fluorinating agent so that the total number of unstable terminal groups is decreased to 7 to 50 per $10^6$ carbon atoms. This is a fluorine-containing polymer powder achieved a high coating efficiency in an electrostatic coating method and provides a film having good properties such as heat resistance, non-tackiness, low frictional property, chemical resistance, etc.

3 Claims, 1 Drawing Sheet

Photograph 1

Photograph 2

Photograph 3

FOREIGN PATENT DOCUMENTS

| | | | |
|---|---|---|---|
| EP | 0723979 A1 | 7/1996 |
| EP | 0 780 403 A2 | 6/1997 |
| EP | 1 070 728 A2 | 1/2001 |
| EP | 1 170 120 A1 | 1/2002 |
| GB | 2 262 100 A | 6/1993 |
| JP | 60-240713 A | 11/1985 |
| JP | 63-270740 A | 11/1988 |
| JP | 64-66246 A | 3/1989 |
| JP | 4-20507 | 1/1992 |
| JP | 6-128335 | 5/1994 |
| JP | 7-9223 U | 2/1995 |
| JP | 7-90024 A | 4/1995 |
| JP | 10-017621 | * 1/1998 |
| JP | 10-17621 A | 1/1998 |
| JP | 10-87746 A | 4/1998 |
| JP | 2000-263715 | 9/2000 |
| JP | 2001-48922 | 2/2001 |
| JP | 2001-55418 A | 2/2001 |
| KR | 1995-0005998 | 6/1995 |
| WO | WO 94/05712 A | 3/1994 |
| WO | WO 00/44797 | 8/2000 |
| WO | WO 01/12682 A | 2/2001 |

* cited by examiner

Photograph 1  Photograph 2  Photograph 3

FLUORINE-CONTAINING POLYMER POWDER, METHOD FOR PRODUCING THE SAME AND COATED ARTICLE

CROSS-REFERENCE TO RELATED APPLICATIONS

This is a divisional of application Ser. No. 10/475,862 filed Oct. 24, 2003, now U.S. Pat. No. 7,094,838 which is a 371 of PCT Application No. PCT/JP02/04117 filed Apr. 25, 2002; the above-noted applications incorporated herein by reference in their entirety.

FIELD OF THE INVENTION

The present invention relates to a fluorine-containing polymer powder, a method for producing the same and an article coated therewith. In particular, the present invention relates to a powder of a fluorine-containing polymer in which at least a part of thermally unstable groups present at the terminals of the polymer chains are stabilized and which can be used in electrostatic powder coating, a method for producing such a powder, and a coated article produced using the power of the fluorine-containing polymer.

BACKGROUND ART

Films formed from fluorine-containing polymers have good properties such as heat resistance, abrasion resistance, non-tackiness, low frictional property, chemical resistance, electrical insulation, etc. In particular, heat-meltable fluorine-containing polymers are used in the form of a powder coating in various applications, for example, cookwares such as rice cookers, fry pans, etc., rolls of office automation equipments, pipes and tanks of chemical plants, and the like.

However, the chain terminals of the fluorine-containing polymers may have a small amount of —COF groups due to the polymerization mechanisms. In the case of emulsion polymerization using a polymerization initiator such as ammonium persulfate, —COOH groups are formed at the chain terminals of the polymer. When methanol is used as a molecular-weight adjuster (a chain transfer agent), terminal groups such as —COOH, —COOCH$_3$, —CH$_2$OH, etc. are formed. Since these terminal groups are thermally unstable, they may cause bubbles or generate hydrogen fluoride during the processing of the polymers, and also deteriorate the excellent properties of the films of the fluorine-containing polymers. Thus, the unstable terminal groups are converted to —CF$_3$ group by contacting a fluorinating agent such as fluorine gap with the fluorine-containing polymers (JP-B-08-30097).

A powder coating is often applied to an article by an electrostatic coating method. In particular, in the electrostatic coating method using a corona-charging system, which is most commonly employed, a high negative voltage is applied to the tip end of a spray gun so that an air surrounding the tip end are negatively ionized. Then, powder particles are supplied from a powder-supplying equipment with an air to the spray gun and negatively charged when they pass through the tip end of the spray gun. Thereafter, the charged powder particles are adhered to an article which is grounded by electrostatic attractive force. In this step, the fluorine-containing polymer, most of the unstable terminal groups of which are converted to —CF$_3$ groups, is not easily negatively charged so that a coating efficiency of the powder is very low.

SUMMARY OF THE INVENTION

One object of the present invention is to provide a fluorine-containing polymer powder which can achieve a high coating efficiency of the polymer particles in the electrostatic coating method and can provide a film having good properties such as heat resistance, non-tackiness, low frictional property, chemical resistance, etc., and a method for producing such a fluorine-containing polymer powder.

Another object of the present invention is to provide an article coated with such a fluorine-containing polymer powder.

The above objects can be achieved by a stabilized fluorine-containing polymer powder having an average particle size of 5 to 100 μm prepared by contacting a fluorine-containing polymer powder, which is prepared by milling the fluorine-containing polymer and removing fine particles, fibrous particles and coarse particles by classification, with a fluorinating agent so that the total number of unstable terminal groups is decreased to 7 to 50 per $10^6$ carbon atoms.

Furthermore, the above objects can be achieved by a stabilized fluorine-containing polymer powder having an average particle size of 5 to 100 μm prepared by mixing fluorine-containing polymer powder A with fluorine-containing polymer powder B, which is prepared by treating fluorine-containing polymer powder A with a fluorinating agent so that the total number of unstable terminal groups is decreased to 25 or less per $10^6$ carbon atoms, to obtain a mixture of fluorine-containing polymer powders having 50 unstable terminal groups or less per $10^6$ carbon atoms, milling the mixture and classifying the milled mixture to remove fine particles, fibrous particles and coarse particles.

Accordingly, the present invention provides the following methods for producing a fluorine-containing polymer powder:

1. A method for producing a fluorine-containing polymer powder having an average particle size of 5 to 100 μm comprising the step of contacting a fluorine-containing polymer powder with a fluorinating agent so that the total number of —CH$_2$OH and —COF terminal groups is decreased to 7 to 50 per $10^6$ carbon atoms.

2. A method for producing a fluorine-containing polymer powder having an average particle size of 5 to 100 μm comprising the steps of contacting a fluorine-containing polymer powder with a fluorinating agent so that the total number of —CH$_2$OH and —COF terminal groups is decreased to 7 to 50 per $10^6$ carbon atoms, and contacting the fluorine-containing polymer powder with ammonia gas to convert the —COF groups to —CONH$_2$ groups so that the total number of —CH$_2$OH and —CONH$_2$ terminal groups is decreased to 7 to 50 per $10^6$ carbon atoms.

3. A method for producing a fluorine-containing polymer powder comprising the steps of mixing fluorine-containing polymer powder A with fluorine-containing polymer powder B, which is prepared by contacting fluorine-containing polymer powder A with a fluorinating agent so that the total number of —CH$_2$OH and —COF terminal groups is decreased to 25 or less per $10^6$ carbon atoms, to obtain a mixture of fluorine-containing polymer powders having 50 or less of —COOH, —COOCH$_3$, —CH$_2$OH and —COF terminal groups per $10^6$ carbon atoms, increasing a density of the fluorine-containing polymer powder so that a specific gravity reaches at least 90% of the true specific gravity of the fluorine-containing polymer, milling the mixture, air classifying the milled mixture to remove fine particles and fibrous particles in an amount of 30 to 40% of the whole particle size distribution of the milled mixture, and classifying the residual mixture to remove coarse particles in an amount of 1 to 20% of the whole particle size distribution.

4. A method for producing a fluorine-containing polymer powder comprising the steps of mixing fluorine-containing polymer powder A with fluorine-containing polymer powder B, which is prepared by contacting fluorine-containing polymer powder A with a fluorinating agent so that the total number of —CH$_2$OH and —COF terminal groups is decreased to 25 or less per $10^6$ carbon atoms, to obtain a mixture of fluorine-containing polymer powders having 50 or less of —COOH, —COOCH$_3$, —CH$_2$OH and —COF terminal groups per $10^6$ carbon atoms, increasing a density of the fluorine-containing polymer powder so that a specific gravity reaches at least 90% of the true specific gravity of the fluorine-containing polymer, milling the mixture, air classifying the milled mixture to remove fine particles and fibrous particles in an amount of 30 to 40% of the whole particle size distribution of the milled mixture, classifying the residual mixture to remove coarse particles in an amount of 1 to 20% of the whole particle size distribution, and heat treating the residual fluorine-containing polymer powder at a temperature equal to or higher than the melting point of the polymer powder.

5. A method for producing a fluorine-containing polymer powder comprising the steps of mixing fluorine-containing polymer powder A with fluorine-containing polymer powder C, which is prepared by contacting fluorine-containing polymer powder A with a fluorinating agent so that the total number of —CH$_2$OH and —COF terminal groups is decreased to 25 or less per $10^6$ carbon atoms and then contacting the fluorine-containing polymer with ammonia gas to convert the —COF groups to —CONH$_2$ groups, to obtain a mixture of fluorine-containing polymer powders having 50 or less of —COOH, —COOCH$_3$, —CH$_2$OH, —COF and —CONH$_2$ terminal groups per $10^6$ carbon atoms, increasing a density of the fluorine-containing polymer mixture so that a specific gravity reaches at least 90% of the true specific gravity of the fluorine-containing polymer, milling the mixture, air classifying the milled mixture to remove fine particles and fibrous particles in an amount of 30 to 40% of the whole particle size distribution of the milled mixture, and classifying the residual mixture to remove coarse particles in an amount of 1 to 20% of the whole particle size distribution.

Furthermore, the present invention provides a fluorine-containing polymer powder produced by one of the above methods, and an article electrostatically coated with the fluorine-containing polymer powder.

PREFERRED EMBODIMENTS TO WORK THE INVENTION

Figure 1:
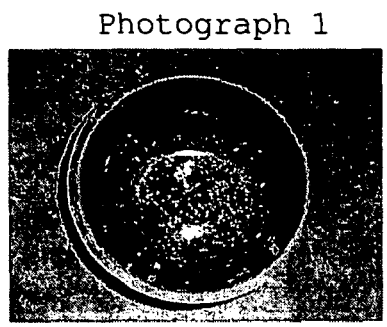
FIG. 1 shows Photographs 1, 2 and 3, which are used as criteria determining the releasability of rice from a rice cooker.
Figure 1:
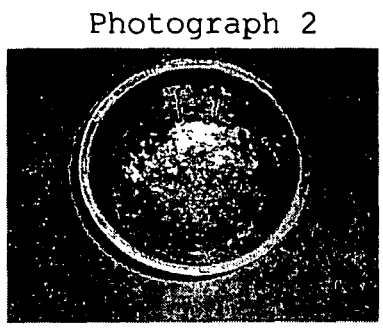
Figure 1:
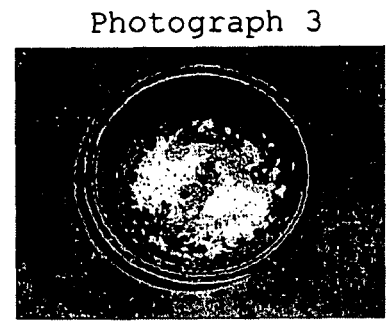

Hereinafter, the present invention will be explained in detail.

<Fluorine-Containing Polymer>

In the present invention, examples of the fluorine-containing polymer include tetrafluoroethylene-perfluoroalkyl vinyl ether copolymers, tetrafluoroethylene-hexafluoropropylene copolymers, ethylene-tetrafluoroethylene copolymers, ethylene-chlorotrifluoroethylene copolymers, polyvinylidene fluoride, etc. Among them, tetrafluoroethylene-perfluoroalkyl vinyl ether copolymers (PFA) are preferable because of their good heat resistance.

(A) Conversion of Unstable Terminal Groups

The unstable terminal groups of the fluorine-containing polymer, for example, —COOH, —COOCH$_3$ and —CH$_2$OH are converted to —COF and finally to —CF$_3$, when they are contacted with a fluorinating agent. In the present invention, the contact with the fluorinating agent is stopped when the total number of the —CH$_2$OH and —COF terminal groups reaches 7 to 50 per $10^6$ carbon atoms. As the fluorinating agent, fluorine gas is most preferably used since it does not leave any metal impurity and achieves a high fluorination efficiency, although other fluorinating agents may be used.

Although the fluorine-containing polymer powder prepared in the previous process may be used as such, it can be contacted with ammonia gas to convert the —COF groups to the —CONH$_2$ groups so that the more stable fluorine-containing polymer powder is obtained. In this case, all the —COF groups are converted to the —CONH$_2$ groups and thus the total number of the —CH$_2$OH and —CONH$_2$ terminal groups is 7 to 50 per $10^6$ carbon atoms. The resulting fluorine-containing polymer powder may contain fluoride ions in the form of ammonium fluoride.

Concretely, the fluorination in the first step is carried out by contacting PFA with fluorine gas usually at a temperature of 150 to 250° C., preferably a temperature up to 200° C. for 1 to 10 hours, preferably 2 to 5 hours. A pressure is from 1 to 10 atm., and usually atmospheric pressure. The fluorinating agent used may be pure fluorine gas, while fluorine gas which is diluted with an inert gas to a concentration of 2 to 25% by volume, preferably 7 to 15% by volume is preferably used from the viewpoint of safety. Examples of the inert gas include nitrogen gas, argon gas, helium gas, etc.

In the second step for amidation, PFA obtained in the first step is contacted with ammonia gas to convert the —COF groups to the —CONH$_2$ groups. Before supplying the ammonia gas, PFA is preferably cleaned with an inert gas such as nitrogen gas. The ammonia gas may be a pure one (100%) or may be diluted with an inert gas to a concentration of about 5 to 50% by volume. An amidation time may not be limited, and is usually from 0.5 to 5 hours, preferably from 60 to 90 minutes. A temperature and a pressure are not limited either. The temperature is usually from 0 to 100° C., preferably around room temperature (10 to 30° C.), and the pressure is from 0.5 to 10 atm., preferably atmospheric pressure.

The above fluorination treatment may be carried out in any step in the production process described in Section (B).

The measurement of the number of terminal groups will be explained in the Examples described below.

The number of the terminal groups such as —COOH, —COOCH$_3$, —CH$_2$OH, —COF, —CONH$_2$, etc. can be decreased to 50 or less per $10^6$ carbon atoms by mixing a fluorine-containing polymer powder which has not been treated with a fluorinating agent and a fluorine-containing polymer powder which has been contacted with a fluorinating agent until the total number of the —CH$_2$OH and —COF groups is reduced to 25 or less per $10^6$ carbon atoms and then contacted with ammonia gas to convert the —COF groups to the —$CONH_2$ group so that the total number of the —$CH_2OH$ and —$CONH_2$ groups is reduced to 25 or less per $10^6$ carbon atoms.

However, in this case, the fluorine-containing fluorine powders should be mixed before they are compressed to form a sheet in the production process described in Section (B). If the two fluorine-containing polymer powders are mixed after the formation of the sheet, the particles which are fluorinated and those which are not fluorinated are independently formed.

(B) Production of Fluorine-Containing Polymer Powder

The fluorine-containing polymer powder of the present invention is preferably produced by increasing the density of the fluorine-containing polymer so that its specific gravity reaches at least 90% of the true specific gravity of the fluorine-containing polymer, that is the specific gravity of a melt molded article; milling the mixture of the fluorine-containing polymers; air classifying the milled mixture to remove fine particles and fibrous particles in an amount of 30 to 40% of the whole particle size distribution of the milled mixture; and classifying the residual mixture to remove coarse particles in an amount of 1 to 20% of the whole particle size distribution.

More preferably, the fluorine-containing polymer powder is heat treated at a temperature equal to or higher than the melting point of the polymer powder after the removal of the coarse particles by classification.

Firstly, the raw material fluorine-containing polymer powder is compressed to form a sheet using, for example, rolls so that its specific gravity reaches at least 90%, preferably 95 to 99% of the true specific gravity of the fluorine-containing polymer.

When the specific gravity after compression is less than 90% of the true specific gravity, the apparent density of the powder obtained after milling is low and the powder has low flowability. When the specific gravity after compression exceeds 99% of the true specific gravity, the shapes of the powder particles obtained by milling may become less uniform so that the apparent density of the powder obtained after milling may be low and the powder may have low flowability.

In the sheet formation with the rolls, the thickness of the sheet is usually from 0.05 to 5 mm, preferably from 0.1 to 3 mm. the number of rolls used are preferably at least two which are arranged vertically, reverse L figure, Z figure, etc. Practically, calendering rolls, mixing rolls, roller compacter, and the like can be used. When such rolls are used, a large shear force is applied to the raw material fluorine-containing polymer powder so that voids or bubbles in the raw material powder are removed and thus a uniform sheet can be obtained. The sheet is preferably produced at a temperature of 0 to 250° C., preferably 5 to 150° C. under conditions such that a milky white or transparent sheet is produced.

In general, the sheet is crushed with a crusher to an average particle size of 0.1 to 10 mm, and then milled with a mill.

In the crushing step, preferably the sheet is crushed with fixing a screen or a mesh having pores with the same size as the crushed particles, or the sheet is passed through several sets of rolls having uneven surfaces with grooves or waves, to achieve an average particle size of 0.1 to 10 mm.

The milling is usually carried out with a mechanical mill. Examples of the mechanical mill include impact type mills such as a cutter mill, a hammer mill, a pin mill, a jet mill, etc., and grinding type mills which mill a material with a shear force generated by a rotating blade and a peripheral stator. The mills of a high shear type are preferable from the viewpoint of milling efficiency. The milling temperature is from −200 to +100° C. In the freeze milling, the temperature is usually from −200 to −100° C., although the milling may be carried out at room temperature (10 to 30° C.). In the freeze milling, usually liquid nitrogen is used, but facilities are huge and the milling cost increases. The milling is usually carried out at room temperature (10° C.) to 100° C., preferably around room temperature (10 to 30° C.), since the process steps become simple and the milling cost is kept low.

The obtained powder particles are not in the less uniform shape such as agglomerates of fine particles or powder obtained by grinding pellets, but they have a uniform particle size and an average particle size of 5 to 100 μm.

After the fine particles and fibrous particles are removed by air classifying, the particles are further classified to remove the coarse particles.

In the air classification, the milled particles are supplied in a cylindrical classifying room with air under reduced pressure, and dispersed with whirling air in the room while the fine particles are being classified by centrifugal force. The fine particles are collected from the center of the room to a cyclone and a bag filter, and again sheeted. In the classifying room, a rotating member such as a cone or a rotor is set for uniformly whirling the particles and the air.

When classification cones are used, the classification is controlled by adjusting the flow of secondary air and a gap between the classification cones. When a rotor is used, the classification is controlled by adjusting the flow of air in the classifying room with a rotation speed of the rotor.

The air pressure of a blower is usually from 0.1 to 1 MPa, preferably from 0.3 to 0.6 MPa. The range of classification is usually from 3 to 40% by weight, preferably 5 to 30% by weight, and thus the fine particles and fibrous particles are removed in a percentage of 3 to 40% by weight based on the whole particles. When the amount of the fine particles removed is less than 3% by weight, the flowability of the powder is not improved, and the remaining particles have a very wide particle size distribution so that the leveling property of the coated film deteriorates. When the amount of the particles removed exceeds 40% by weight, the powder becomes less attractive from the viewpoint of costs.

To remove coarse particles, an air classifier or a vibration sieve based on meshes can be used, with the former being preferable. The range of classification based on particle sizes is usually from 1 to 20% by weight, preferably from 2 to 10% by weigh of the whole particle size distribution of the milled powder. The coarse particles in this rage are removed.

The fine particles and fibrous particles recovered in the air classification step are again sheeted like the raw material powder. The coarse particles classified by the air classifier or vibration sieve are recycled to the mill.

When the classified powder is contacted with an air stream at a temperature higher than the melting-initiation temperature of the fluorine-containing polymer powder for an instance using a continuous airflow type heating drier, the surfaces of the powder particles are rounded so that the apparent density and flowability of the powder are further increased. Thus, a preferable coating powder can be obtained.

A contact temperature in the continuous airflow type heating drier is usually 1000° C. or less, preferably from 200 to 800° C., and a contact time is from 0.1 to 10 seconds. A heat source is preferably gas heating from the viewpoint of saving energy. The heat-treated powder is further classified with the air classifier or vibration sieve to remove the coarse particles. Thereby, a powder having a narrower particle size distribution can be obtained.

The resulting powder can be coated very thinly to form a thin film having a thickness of 5 to 30 μm. When a very thin film having a good leveling property is intended to be formed, it is required for a fluorine-containing polymer powder to have uniform particle shapes, a high apparent density, good flowability and easy melting properties. Furthermore, the powder has an average particle size of 5 to 30 μm, preferably 10 to 25 μm. When any one of the above requirements is not met, a film formed may have pinholes or orange-peel surfaces.

When a film having a thickness of 30 to 100 μm is intended to be formed, the heat treatment of the fluorine-containing polymer powder may not always be necessary. The powder for coating should have uniform particle shapes and an average particle size of 5 to 100 μm, preferably 30 to 60 μm.

The powder can be coated by a coating method such as spray coating, electrostatic spray coating, fluidized bed coating, electrostatic fluidized bed coating, etc. An aqueous dispersion paint or a dispersion paint in an organic solvent may be used.

As already explained, it was known to convert the unstable terminal groups of fluorine-containing polymer powder to —$CF_3$ groups to increase the properties such as heat resistance, non-tackiness, low frictional property, chemical resistance, etc. of the film formed from the fluorine-containing polymer powder. However, the fluorine-containing polymer powder almost all the terminal groups of which are converted to the —$CF_3$ groups is hardly charged negatively so that it cannot be adhered to an adherent and thus the coating efficiency is very low. In contrast, a fluorine-containing polymer powder having the small number of such unstable terminal groups can keep the negative charge. Therefore, such a polymer powder can achieve a high coating efficiency and, in turn, a film formed from such a polymer powder can sufficiently exhibit the excellent properties of the fluorine-containing polymer.

In concrete, when the total number of the unstable terminal groups of the fluorine-containing polymer particles is 6 or less per $10^6$ carbon atoms, the coating efficiency remarkably decreases. When the total number of the unstable terminal groups of the fluorine-containing polymer particles exceeds 50, the non-tackiness of the film deteriorates.

When the particles which are fluorinated and those which are not fluorinated are independently formed as described in Section (A), the latter particles are selectively adhered to the adherent so that the coating efficiency decreases, and thus the film formed may not have good properties.

The fluorine-containing polymer powder is preferably produced by the milling method described in Section (B), although it may be prepared by spray drying a dispersion of the polymer prepared by emulsion polymerization (JP-B-53-11296).

Electrical charges present near the tip end of a spray gun reach the powder particles along the electric line of power. Since the powder particles produced by spray drying are spherical, the electric line of power does not easily reach the particles. On the other hand the power particles produced by milling are non-spherical and have at least one pointed part, and the electrical powder line easily reaches such a pointed part. Therefore, the power particles produced by milling can maintain a sufficient amount of electric charges, and achieve a high coating efficiency.

Examples of the applications in which the fluorine-containing polymer powder for electrostatic coating according to the present invention includes home appliances such as kitchen wares, etc.; applications which require weather resistance such as metal plates for constructions, etc.; applications which require heat resistance and non-tackiness such as rolls for copying machines and printers, industrial rolls, hoppers, etc.; applications which require chemical resistance such as pipes and tanks of chemical plants; and the like.

EXAMPLES

The present invention will be illustrated by the following examples.

In the examples, the properties were measured as follows:

Average Particle Size:

An average particle size of polymer powder particles was measured with a laser diffraction-scattering type particle size distribution meter (SALD-1100 manufactured by Shimadzu Corporation) using isopropanol as a solvent.

Analysis of Terminal Groups:

A fluorine-containing polymer powder was compression molded at 350° C. for 30 minutes to form a film having a thickness of 0.25 to 0.3 mm. This film was subjected to infrared spectral analysis and the spectrum was compared with that of a known film so that the kinds of the terminal groups were determined. From the differential spectrum, the number of the terminal groups was calculated:

No. of terminal group (per $10^6$ carbon atoms)=$I \times K/t$ wherein I is an absorption intensity, K is a correction factor, and t is a thickness of a film.

The correction factors of terminal groups to be analyzed are shown below. The correction factor is determined from the infrared spectrum of a model compound for calculating the number of terminal groups per $10^6$ carbon atoms.

TABLE 1

| Terminal group | Absorption wavelength ($cm^{-1}$) | Correction factor K |
|---|---|---|
| —COOH | 1810 | 440 |
| —$COOCH_3$ | 1795 | 400 |
| —$CH_2OH$ | 3648 | 2300 |
| —COF | 1883 | 440 |
| —$CONH_2$ | 3436 | 460 |

The infrared spectrum was measured with Perkin-Elmer FTIR Spectrometer 1760× and Perkin-Elmer 7700 Professional Computer (both manufactured by Perkin-Elmer) at 100 times scanning.

Coating Efficiency:

A fluorine-containing polymer powder was applied on an aluminum plate of 10 cm square for 3 seconds using an electrostatic powder coating apparatus (INTEGRAL 2007A manufactured by NIPPON WAGNER SPRAY TEC Co., Ltd.). A coated weight was calculated from the difference between the total weight of the coated aluminum plate and the uncoated aluminum plate. Using the same coating apparatus, the fluorine-containing polymer powder was discharged in a polyethylene bag for 3 seconds. A discharged weight was calculated from the total weight of the polyethylene bag after discharging and the weight of the polyethylene bag before discharging.

The coating efficiency was calculated by the following equation:

Coating efficiency=Coated weight/discharged weight

Releasability of Rice from a Rice Cooker:

The inner pot of a rice cooker (RCK-X18Z manufactured by Toshiba Corporation) was sand blasted, coated with a primer (EK-1909 BKN manufactured by Daikin Industries, Ltd.; main components: polytetrafluoroethylene and polyamideimide) and dried, and then coated with a fluorine-containing polymer powder and baked 380° C. for 20 minutes. This inner pot was placed in the above rice cooker, and 180 ml of rice was cooked in a standard mode. After 30 seconds from the completion of rice cooking, the inner pot was taken out from the cooker, and dropped upside down from the height of 5 cm. After dropping, when substantially no rice remained on the inner wall of the pot as shown in Photograph 1 of FIG. 1, the coating was ranked "A", when the rice partly remained as shown in Photograph 2 of FIG. 1, the coating was ranked "B", and when a large amount of rice remained as shown in Photograph 3 of FIG. 1, the coating was ranked "C".

Example 1

According to the process described in JP-A-58-189210, a tetrafluoroethylene-perfluoroalkyl vinyl ether copolymer (PFA) (weight ratio of tetrafluoroethylene:perfluoroalkyl vinyl ether =97:3) was prepared by aqueous suspension polymerization. This polymer was named "Polymer Raw Powder A", which had an apparent density of 0.65, a true density of 2.15 and an average particle size of 350 µm.

Polymer Raw Powder A was compressed in a sheet-form with a roller compacter (BCS-25 manufactured by Sinto Kogio, Ltd.) to form a polymer sheet having a width of 60 mm and a thickness of 5 mm. The sheet had a specific density of 2.1. The polymer sheet was crushed with a crusher which is attached to the above roller compactor to a size of about 2 mm to obtain Crushed Polymer B.

The polymer was fluorinated by contacting fluorine gas with Crushed Polymer B at 200° C. for 4 hours to obtain Fluorinated Crushed Polymer C. The fluorine gas was used after dilution with nitrogen gas to a concentration of 20% by volume for the sake of safety, and the mixed gas was supplied under a pressure of 1 kgf/cm$^2$.

Then, ammonia gas was contacted with fluorinated Crushed Polymer C at room temperature for 1 hour to obtain Amidated Crushed Polymer D. The ammonia gas was supplied under a pressure of 1 kgf/cm$^2$.

Amidated Crushed Polymer D was milled with a mill (Cosmomizer N-1 manufactured by Nara Machine Manufacturing Co., Ltd.) at room temperature at 11,000 rpm to obtain Polymer Powder E.

Polymer Powder E was classified with an air classifier (Micron Classifier MC100 manufactured by SEISHIN KIGYO Co., Ltd.), and fine particles with a low apparent density and fibrous particles were classified and removed with a cyclone and a bag filter. The amount of removed particles was 15% by weight. Then, the remaining particles were classified with a classifier (High Bolder 300SD manufactured Shin-Tokyo Machinery Co., Ltd.) to remove coarse particles of 170 mesh (opening of 88 µm) or higher. Thereby, Polymer Powder F was obtained. The removed amount was 4% by weight.

Polymer Powder F was contacted with a hot gas stream of 550° C., which is higher than the melting-initiation temperature of PFA, for about 1 second using a continuous air stream drier (Flash Jet Drier, 4 inch type, manufactured by SEISHIN KIGYO Co., Ltd.) to obtain Heat-Treated Polymer Powder G.

With Heat-Treated Polymer Powder G, the terminal groups, coating efficiency and releasability of rice were analyzed and evaluated.

Example 2

With Polymer Powder E prepared in the process of Example 1, the terminal groups, coating efficiency and releasability of rice were analyzed and evaluated.

Comparative Example 1

Crushed Polymer B prepared in the process of Example 1, which had not been fluorinated, was milled with a mill (Cosmomizer N-1 manufactured by Nara Machine Manufacturing Co., Ltd.) at room temperature at 11,000 rpm.

The milled polymer was classified with a classifier (Micron Classifier MC100 manufactured by SEISHIN KIGYO Co., Ltd.), and fine particles with a low apparent density and fibrous particles were classified and removed with a cyclone and a bag filter. Then, the remaining particles was classified with a classifier (High Bolder 300SD manufactured Shin-Tokyo Machinery Co., Ltd.) to remove coarse particles of 170 mesh (opening of 88 µm) or higher.

The classified polymer powder was contacted with a hot gas stream of 550° C., which is higher than the melting-initiation temperature of PFA, for about 1 second using a continuous air stream drier (Flash Jet Drier, 4 inch type, manufactured by SEISHIN KIGYO Co., Ltd.) to obtain Polymer Powder H.

With Polymer Powder H, the terminal groups, coating efficiency and releasability of rice were analyzed and evaluated.

Comparative Example 2

Crushed Polymer B, which was prepared in the process of Example 1, was well fluorinated by contacting fluorine gas with Crushed Polymer B at 230° C. for 5 hours, and then amidated by contacting the fluorinated polymer with ammonia gas at room temperature for 1 hour. The fluorine gas was used after dilution with nitrogen gas to a concentration of 20% by volume for the sake of safety, and the mixed gas was supplied under a pressure of 1 kgf/cm$^2$. The ammonia gas was supplied under a pressure of 1 kgf/cm$^2$.

The amidated crushed polymer was milled with a mill (Cosmomizer N-1 manufactured by Nara Machine Manufacturing Co., Ltd.) at room temperature at 11,000 rpm to obtain a polymer powder.

This polymer powder was classified with a classifier (Micron Classifier MC100 manufactured by SEISHIN KIGYO Co., Ltd.), and fine particles with a low apparent density and fibrous particles were classified and removed with a cyclone and a bag filter. Then, the remaining particles were classified with a classifier (High Bolder 300SD manufactured Shin-Tokyo Machinery Co., Ltd.) to remove coarse particles of 170 mesh (opening of 88 µm) or higher.

Thereafter, the polymer powder was contacted with a hot gas stream of 550° C., which is higher than the melting-initiation temperature of PFA, for about 1 second using a continuous air stream drier (Flash Jet Drier, 4 inch type, manufactured by SEISHIN KIGYO Co., Ltd.) to obtain Heat-Treated Polymer Powder I.

With Heat-Treated Polymer Powder I, the terminal groups, coating efficiency and releasability of rice were analyzed and evaluated.

Comparative Example 3

Polymer Powder H obtained in Comparative Example 1 and Polymer Powder I obtained in Comparative Example 2 were blended to obtain Polymer Powder J, in which the total number of unstable terminal groups was 7 to 50 per $10^6$ carbon atoms.

With Polymer Powder J, the terminal groups, coating efficiency and releasability of rice were analyzed and evaluated.

Example 3

Polymer Raw Powder A, which was prepared in the process of Example 1, was fluorinated by contacting a fluorine gas with Powder A at 200° C. for 5 hours to obtain Fluorinated Polymer Powder K. The terminal groups of Powder K were analyzed. The total number of unstable terminal groups was 9 per $10^6$ carbon atoms.

Polymer Raw Powder A and Fluorinated Polymer Powder K were blended to obtain Polymer Raw Powder L, in which the total number of unstable terminal groups was 7 to 50 per $10^6$ carbon atoms.

Polymer Raw Powder L was compressed in a sheet-form with a roller compacter (BCS-25 manufactured by Sinto Kogio, Ltd.) to form a polymer sheet having a width of 60 mm and a thickness of 5 mm. The polymer sheet was crushed with a crusher which is attached to the above roller compactor to a size of about 2 mm, and milled with a mill (Cosmomizer N-1 manufactured by Nara Machine Manufacturing Co., Ltd.) at room temperature at 11,000 rpm.

The milled polymer powder was classified with a classifier (Micron Classifier MC100 manufactured by SEISHIN KIGYO Co., Ltd.), and fine particles with a low apparent density and fibrous particles were classified and removed with a cyclone and a bag filter. Then, the remaining particles were classified with a classifier (High Bolder 300SD manufactured Shin-Tokyo Machinery Co., Ltd.) to remove coarse particles of 170 mesh (opening of 88 μm) or higher. Thereby, Polymer Powder M was obtained.

With Polymer Powder M, the terminal groups, coating efficiency and releasability of rice were analyzed and evaluated.

Example 4

Fluorinated Crushed Polymer C, which was prepared in the process of Example 1, was milled with a mill (Cosmomizer N-1 manufactured by Nara Machine Manufacturing Co., Ltd.) at room temperature at 11,000 rpm to obtain Polymer Powder N.

With Polymer Powder N, the terminal groups, coating efficiency and releasability of rice were analyzed and evaluated.

Example 5

With Polymer Powder F which was prepared in the process of Example 1, the terminal groups, coating efficiency and releasability of rice were analyzed and evaluated.

Example 6

Polymer Powder M obtained in Example 3 was contacted with a hot gas stream of 550° C., which is higher than the melting-initiation temperature of PFA, for about 1 second using a continuous air stream drier (Flash Jet Drier, 4 inch type, manufactured by SEISHIN KIGYO Co., Ltd.) to obtain Polymer Powder O.

With Polymer Powder O, the terminal groups, coating efficiency and releasability of rice were analyzed and evaluated.

The results obtained in the above are summarized in Table 2.

TABLE 2

| | Example No. | | | | | |
|---|---|---|---|---|---|---|
| | 1 | 2 | 3 | 4 | 5 | 6 |
| Average particle size (μm) | 20 | 27 | 23 | 28 | 23 | 22 |
| Apparent density | 0.81 | 0.53 | 0.79 | 0.55 | 0.78 | 0.83 |
| No. of terminal groups | | | | | | |
| —COOH | 0 | 0 | 0 | 0 | 0 | 0 |
| —COOCH$_3$ | 0 | 0 | 0 | 0 | 0 | 0 |
| —CH$_2$OH | 10 | 11 | 15 | 13 | 11 | 15 |
| —COF | 0 | 0 | 21 | 20 | 0 | 20 |
| —CONH$_2$ | 21 | 21 | 0 | 0 | 20 | 0 |
| Coating efficiency | 45% | 51% | 47% | 48% | 52% | 45% |
| Releasability of rice | A | A | A | A | A | A |

| | Example No. | | |
|---|---|---|---|
| | C. 1 | C. 2 | C. 3 |
| Average particle size (μm) | 24 | 22 | 14 |
| Apparent density | 0.80 | 0.81 | 0.80 |
| No. of terminal groups | | | |
| —COOH | 5 | 0 | 1 |
| —COOCH$_3$ | 46 | 0 | 7 |
| —CH$_2$OH | 107 | 0 | 17 |
| —COF | 0 | 0 | 0 |
| —CONH$_2$ | 0 | 2 | 1 |
| Coating efficiency | 53% | 21% | 27% |
| Releasability of rice | C | A | B |

The invention claimed is:

1. A method for producing a tetrafluoroethylene-perfluoroalkyl vinyl ether copolymer powder for use in an electrostatic coating method having an average particle size of 5 to 100 μm comprising the step of:
    contacting the tetrafluoroethylene-perfluoroalkyl vinyl ether copolymer powder with a fluorinating agent so that the sum of the numbers of —CH$_2$OH and —COF terminal groups, combined, is decreased to 7 to 50 per $10^6$ carbon atoms.

2. The method for producing a tetrafluoroethylene-perfluoroalkyl vinyl ether copolymer powder for use in an electrostatic coating method according to claim 1, wherein said tetrafluoroethylene-perfluoroalkyl vinyl ether copolymer which is contacted with a fluorinating agent is prepared by increasing a density of the tetrafluoroethylene-perfluoroalkyl vinyl ether copolymer powder under conditions such that a specific gravity reaches at least 90% of the true specific gravity of the tetrafluoroethylene-perfluoroalkyl vinyl ether copolymer, milling the tetrafluoroethylene-perfluoroalkyl vinyl ether copolymer powder having the increased density, air classifying the milled material to remove fine particles and fibrous particles in an amount of 3 to 40% of the whole particle size distribution of the milled material, and classifying the residual material to remove coarse particles in an amount of 1 to 20% of the whole particle size distribution.

3. The method for producing a tetrafluoroethylene-perfluoroalkyl vinyl ether copolymer powder for use in an electrostatic coating method according to claim 1, wherein said tetrafluoroethylene-perfluoroalkyl vinyl ether copolymer fluorine containing polymer which is contacted with a fluorinating agent is prepared by increasing a density of the tetrafluoroethylene-perfluoroalkyl vinyl ether copolymer powder under conditions such that a specific gravity reaches at least 90% of the true specific gravity of the tetrafluoroethylene-perfluoroalkyl vinyl ether copolymer, milling the tetrafluoroethylene-perfluoroalkyl vinyl ether copolymer powder having the increased density, air classifying the milled material to remove fine particles and fibrous particles in an amount of 3 to 40% of the whole particle size distribution of the milled material, and classifying the residual material to remove coarse particles in an amount of 1 to 20% of the whole particle size distribution, and wherein said tetrafluoroethylene-perfluoroalkyl vinyl ether copolymer powder is heat-treated at a temperature equal to or higher than a melting-initiation temperature of the tetrafluoroethylene-perfluoroalkyl vinyl ether copolymer powder after the step of contacting the tetrafluoroethylene-perfluoroalkyl vinyl ether copolymer powder with the fluorinating agent.

* * * * *